July 7, 1970 HANS-JURGEN BROCKMANN 3,519,875
CIRCUIT ARRANGEMENT FOR STATIC AUXILIARY DEFLECTION OF AT LEAST ONE ELECTRON BEAM
Filed Oct. 16, 1968
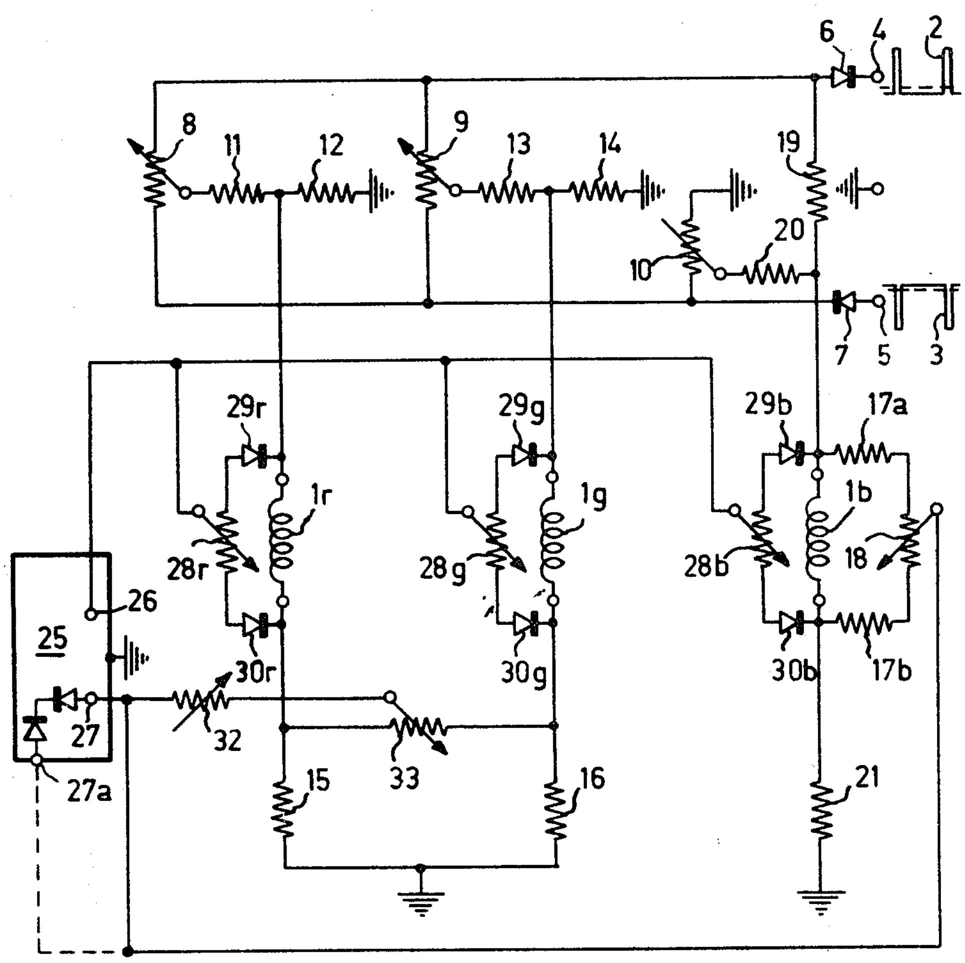
INVENTOR.
HANS-JURGEN BROCKMANN
BY
Frank R. Trifari
AGENT 3,519,875
Patented July 7, 1970

3,519,875

CIRCUIT ARRANGEMENT FOR STATIC AUXILIARY DEFLECTION OF AT LEAST ONE ELECTRON BEAM

Hans-Jurgen Brockmann, Lehmweg 37, Hamburg 20, Germany

Filed Oct. 16, 1968, Ser. No. 767,998
Claims priority, application Germany, Nov. 22, 1967, P 43,452
Int. Cl. H01j *29/50*
U.S. Cl. 315—13 6 Claims

ABSTRACT OF THE DISCLOSURE

An electron beam static convergence system for a color television receiver in which the DC supply for each convergence coil is derived via a rectifier from a voltage source providing a line frequency pulse voltage which is constant during the line sweep period, the rectifier being polarized to be cut off during the line flyback period. A resistance network is connected to each coil and includes means for adjusting the current therein. The pulse voltage source is arranged to have an internal resistance which is small relative to that of the resistance network. The ratio of coil inductance L to the resistance R of the network is chosen to provide an *L/R* time constant that is long relative to the line flyback period.

This invention relates to a circuit arrangement for the static auxiliary deflection of at least one electron beam in a television display tube, more particularly for radial (static) convergence correction in a color display tube having three electron beams in which a direct current flowing through an auxiliary deflection coil is adjusted, the quotient *L/R* of the coil inductance L and the resistance R which is active in the current circuit being large relative to the flyback period of the line deflection current.

In proposed circuit arrangements the required D.C. supply voltage is obtained by rectification of the supply voltage or of the flyback pulses. A considerable voltage decrease is then generally required which, due to the current load in the order of 50 ma., requires much output, and furthermore large electrolytic capacitors of, for example, a few hundred $\mu$f. are required for maintaining the voltage constant.

The invention is based on the recognition of the fact that the deflection coils have a considerable inductance L, the *L/R* time constant of the coils and the resistance R which is active in the added current circuit, being sufficient for smoothing the auxiliary deflection current when the fluctuations of the supply voltage are considerably shorter than the time constant.

In a circuit arrangement of the kind described, a stable auxiliary deflection can therefore be obtained without using large smoothing capacitors and without actual loss of energy if, according to the invention, the supply is effected through at least one rectifier which is cut off during the flyback period from a source having a line-frequency pulse voltage which is at least substantially constant during the sweep period and the internal resistance of which is small relative to a resistance network serving to adjust the auxiliary deflection.

For the sake of completeness, it is to be noted that it is known per se that a line-frequency pulse voltage can be converted into a D.C. voltage across a capacitor by means of a rectifier conducting during the sweep and that this voltage of a proportionally low internal resistance is suitable for control purposes. According to the invention, the capacitor may be omitted altogether, a constant control instead of an adjustment being envisaged at least during the sweep.

In order that the invention may be readily carried into effect, it will now be described in detail by way of example, with reference to the accompanying diagrammatic drawing which shows a preferred embodiment of the invention.

Three auxilary deflection coils 1*r*, 1*g*, and 1*b* which are mainly active for reproducing the colors red, green and blue are provided at a color television display tube, not shown. A D.C. voltage network supplies an adjustable direct current to each coil on the one hand, and an A.C. voltage generator supplies an adjustable current of vertical deflection frequency and varying approximately parabolically to each coil on the other hand. A correction in the rhythm of the horizontal deflection frequency is likewise possible.

According to the invention, the required D.C. voltage is obtained from two line-frequency pulse voltages 2 and 3 of opposite polarities which are applied through the terminals 4 and 5 to the cathode of a diode 6 and the anode of a diode 7, respectively, for example, of the type BA148, relative to ground. The other electrodes of the diodes 6 and 7 are connected together through potentiometers 8 and 9 of 470 ohms each. Furthermore, a potentiometer 10 of 220 ohms is connected between the cathode of the diode 7 and ground. The voltages 2 and 3 have peak-to-peak values of 55 volts and a flyback-sweep ratio of approximately 1:5.6 so that the voltage is substantially constant during the sweep period and is approximately 6 volts. This voltage value is transmitted during the sweep period through the diodes 6 and 7 which are then conducting. The potentiometers 8 and 9 convey a voltage of 10 volts and a voltage of +5 volts relative to ground is set up across the potentiometer 10. According to the invention, the internal resistance of the source of the voltages 2 and 3 is small during the sweep relative to the resistance network connected thereto. The resistance network together with the further resistors to be described hereinafter, has a value in the order of 100 ohms. An internal resistance of approximately 1 ohm has been measured in the circuit arrangement used. The voltage transmitted through the diodes 6 and 7 during the sweep period is therefore substantially independent of certain variations in the resistance network.

For the required auxiliary deflection, voltage dividers consisting of resistors 11 and 13 of 180 ohms each and resistors 12 and 14 of 150 ohms each are connected to the tappings of the potentiometers 8 and 9 and to ground. The tappings of a voltage divider is connected to one (upper) end of the auxiliary deflection coils 1*r* and1*g*, respectively, each having a resistive value of 170 ohms. The other ends of the auxiliary deflection coils 1*r* and 1*g* are connected to ground through resistors 15 and 16, respectively, of 120 ohms each.

Current circuits are formed through the auxiliary deflection coils 1*r* and 1*g*. These circuits are connected to ground approximately parallel to the resistors 12 and 14 and can each convey a current which is adjustable in direction and amplitude in accordance with the positions of the wipers on the potentiometers 8 and 9.

The upper end of the correction coil 1*b* is connected through a resistor 19 of 680 ohms to the anode of the diode 6 and through a resistor 20 of 82 ohms to the wiper on the potentiometer 10. The lower end of the winding 1*b*, which also has a D.C. resistance of 170 ohms, is connected to ground through a resistor 21 of 120 ohms. The adjustment of the direct current in winding 1*b* can be varied by means of the potentiometer 10, the adjusting range being asymmetrical in conformity with the situation known from practice.

In addition to the D.C. adjustment described, an A.C. voltage mainly varying parabolically and having adjustable branches is applied to the coils 1*r*, 1*g* and 1*b* for the purpose of dynamic convergence correction, a feedback to the D.C. adjustment being, however, prevented. To this end two voltages associated with a parabola branch are derived from the outputs 26 and 27 of a generator 25 relative to ground, which voltages are applied to the wipers on potentiometers 28*r*, 28*g* and 28*b*. The ends of these potentiometers are connected through diodes 29*r* and 30*r*, 29*g* and 30*g* and 29*b* and 30*b*, respectively, to the ends of the auxiliary deflection windings 1*r*, 1*g* and 1*b*, respectively. These diodes will conduct only when the voltage received from the terminal 26 is positive relative to the voltage at the associated end of the deflection coil. The positive part of this voltage is then transmitted, in accordance with the adjustment of the relevant potentioneter 28, through one or the other of the diodes 29 or 30, which results in a corresponding current flowing through the deflection coil relative to ground.

A voltage of opposite polarity is applied from the output 27 through a series resistor 32, serving for amplitude adjustment, to the wiper on a potentiometer 33 which is connected between the lower ends of the windings 1*r* and 1*g*. The difference between the amplitudes of the currents flowing through the windings 1*r* and 1*g* can be adjusted with the aid of the potentiometer 33, particularly with a view to their direction.

A voltage divider which consists of a resistor 17*a* of 680 ohms, a potentiometer 18 of 1K ohm and a resistor 17*b* of 180 ohms is connected parallel to the winding 1*b* from the cathode of the diode 29*b* to the cathode of the diode 30*b*. The wiper on the potentiometer 18 receives the voltage from terminal 27. The amplitudes of the A.C. components applied to the winding 1*b* can be varied by adjusting this wiper. A better independency of other switching adjustments can be obtained when the wiper on the potentiometer 18 is connected to the generator 25 at the terminal 27*a* through a diode which has a similar polarity and is separated from the diode located at terminal 27. the different values of the resistors 17*a* and 17*b* are the result of the fact that although values in different directions are required for the A.C. amplitude, the deviations from the neutral point in the two directions of polarity must have different values due to the tolerances to be observed.

All resistors which are located between the ends of the coils and which are also connected to ground are measures of the time constant $L/R$ of each deflection coil. The value of this effective resistance R can easily be estimated. It consists of the coil resistance and the resistors, for example, 12 and 15 at the winding 1*r*, which are directly connected to ground, said resistors being connected parallel to further network branches having slightly higher resistances which slightly reduce the resistance R, for example, by 50% relative to the resistors 12 and 15. For a winding inductance of 1.5 H, a value of 3.8 ms. resulted for the said time constant and this value is sufficiently high relative to the flyback period of approximately 11 $\mu$s.

The direct current flowing through the coils is at most approximately 5 ma. As a result thereof, there is no disturbing feedback produced by the D.C. adjustment of one coil on the D.C. voltage determining the D.C. adjustment of a different coil.

As a result of the low internal resistance of the pulse voltage source 2, 3 the voltage at the internal resistors is sufficiently constant during the sweep period and hence during the greater part of the deflection period. Consequently, a fixed current determined by the potentiometer adjustments flows through each auxiliary deflection coil 1*r*, 1*g*, 1*b*.

The pulse voltages 2 and 3 are switched off during the flyback period by means of the diodes 6 and 7. The maximum energy in the auxiliary deflection windings then decreases in accordance with the time constant $L/R$. Since this time constant is long relative to the flyback period, the current flowing through the auxiliary deflection coils substantially does not vary during this period and hence a substantially constant auxiliary deflection current is obtained without large storage capacitors.

What is claimed is:

1. In a television system having a display tube and a deflection system for deflecting one or more electron beams at line and field deflection frequencies, the improvement comprising a circuit for static auxiliary deflection of at least one electron beam in said display tube comprising, an auxiliary deflection coil having an inductance L, a resistance network having a resistance R and coupled to said coil and including means for adjusting the direct current flow in said coil, the ratio $L/R$ being chosen to provide a time constant that is large relative to the flyback period of the line deflection current of said deflection system, and a source of direct current for said coil comprising, a voltage source providing a line frequency pulse voltage which is substantially constant during the sweep portion of the line deflection current and the internal resistance of which is small relative to the resistance of said resistance network, and a rectifier coupling said voltage source to said auxiliary coil and polarized so that the rectifier is cut off during the flyback period of the line deflection current.

2. A system as claimed in claim 1 further comprising, a source of AC voltage having a parabolic waveform, and means for coupling said AC voltage to said coil and including means for adjusting the amplitude of the parabolic current coupled to said coil.

3. A system as claimed in claim 2 wherein said coupling means includes first and second diodes connected with the same polarity between opposite ends of said coil and the output of said AC voltage source.

4. A system as claimed in claim 1 wherein said resistance network comprises, a potentiometer connected in series with said pulse voltage source and said rectifier, a voltage divider connected to the slider of said potentiometer, and means connecting said coil to a junction on said voltage divider.

5. In a color television receiver including a display tube and a deflection system for deflecting a plurality of electron beams together in a horizontal and a vertical direction, a beam convergence system comprising, a plurality of convergence coils equal to the number of electron beams and each having an inductance L, a resistance network for each of said coils having a resistance R, means for directly coupling each of said coils to a respective resistance network, each of said networks having means for adjusting the direct current flow in its associated coil, the $L/R$ ratio for each coil and its associated network being chosen to provide a time constant that is long relative to the flyback period of the horizontal deflection current of said deflection system, a voltage source providing a pulse voltage waveform at the horizontal deflection frequency which exhibits a substantially constant amplitude during the sweep portion of the horizontal deflection current and an internal resistance which is small relative to the resistance of each of said resistance networks, and a rectifier coupling said voltage source to said convergence coils and to said resistance networks and polarized so that the rectifier is cut off during said horizontal flyback period.

6. A system as defined in claim 5 wherein at least one of said resistance networks comprises, a potentiometer connected in series with said pulse voltage source and said rectifier, means directly connecting the coil associated with said resistance network to the slider of said potentiometer, a source of AC voltage having a parabolic waveform at the vertical deflection frequency, and diode means directly coupling said AC voltage source to said convergence coils.

References Cited

UNITED STATES PATENTS

| | | |
|---|---|---|
| 3,163,797 | 12/1964 | Singleback. |
| 3,375,398 | 3/1968 | Ohlhorst. |
| 3,414,758 | 12/1968 | Grue. |

RODNEY D. BENNETT, Primary Examiner

M. F. HUBLER, Assistant Examiner